| United States Patent [19] | [11] Patent Number: 4,769,412 |
| Inoue et al. | [45] Date of Patent: Sep. 6, 1988 |

[54] ROOM TEMPERATURE-CURABLE SILICONE RUBBER COMPOSITION

[75] Inventors: Yoshio Inoue; Masatoshi Arai; Kazuyuki Suzuki, all of Gunma, Japan

[73] Assignee: Shin-Etsu Chemical Co., Ltd., Tokyo, Japan

[21] Appl. No.: 929,999

[22] Filed: Nov. 12, 1986

[30] Foreign Application Priority Data

Nov. 27, 1985 [JP] Japan .............................. 60-266688

[51] Int. Cl.$^4$ ...................... C08K 3/22; C08L 83/04
[52] U.S. Cl. .................................. 524/431; 524/785; 524/863
[58] Field of Search .................. 524/431, 785, 863; 525/477; 528/22, 34, 33

[56] References Cited

U.S. PATENT DOCUMENTS

| 3,696,090 | 10/1972 | Lampe | 524/431 |
| 3,819,563 | 6/1974 | Takago | 524/431 |
| 4,138,387 | 2/1979 | Bluestein | 524/431 |
| 4,513,115 | 4/1985 | Beers | 528/22 |

*Primary Examiner*—John C. Bleutge
*Assistant Examiner*—David Buttner
*Attorney, Agent, or Firm*—Jules E. Goldberg

[57] ABSTRACT

A room temperature-curable silicone rubber composition having improved heat-resistance is disclosed. The composition is formulated without any siliceous fillers as a reinforcing inorganic filler conventionally used in silicone compositions and, instead, comprises carbon black as a reinforcing filler. Namely, the composition comrises a major amount of a hydroxy-containing organopolysiloxane admixed with a minor amount of an organosilicon compound having at least two hydrolyzable groups per molecule, a curing catalyst, carbon black and iron oxide.

5 Claims, No Drawings

ROOM TEMPERATURE-CURABLE SILICONE RUBBER COMPOSITION

BACKGROUND OF THE INVENTION

The present invention relates to a room temperature-curable silicone rubber composition or, more particularly, to a room temperature-curable silicone rubber composition with a high degree of heat-resistance comprising carbon black as the filler substituting for the siliceous filler used in the art of conventional silicones.

Conventionally, various types of room temperature-curable silicone rubber compositions are known although the heat-resistance thereof is insufficient without exception. A prior art method of improving the heat-resistance of such a silicone rubber composition has been proposed by way of admixing iron(III) oxide. Furthermore, several alternative methods of the above have been proposed, when coloration of silicone compositions due to iron(III) oxide is undesirable, including a method of using ceric oxide or other rare earth metal oxides as the heat-resistance improver (Japanese Patent Publication No. 36-6189), a method of combined use of certain kinds of metal oxides or metal hydroxides therewith (Japanese Patent Publication No. 37-837) and other methods. However, none of these methods can give sufficient heat-resistance at a high temperature such as 280° C. or higher showing a disadvantage of deterioration of the cured silicone composition, for example, after a few days at 300° C. as evidenced by the conversion of a rubbery elastomer into a hard resinous mass.

The inventors of the present invention have unexpectedly arrived at a recognition that the poor heat-resistance of silicone rubber compositions is caused by the siliceous fillers conventionally used as an inorganic filler in silicone rubber compositions after extensive studies with an object to obtain a room temperature-curable silicone rubber composition having excellent heat-resistance. The inventors have completed the present invention on the base of an unexpected discovery that the heat-resistance of silicone rubber compositions can be improved by use of carbon black as an inorganic filler asubstituting for siliceous fillers in combination with iron oxide known as a heat-resistance improver with an object of further upgrading. For example, the inventors have confirmed a fact that the cured silicone rubber poducts obtained from the composition formulated in accordance with the above discovery show little deterioration in the physical properties even after heating in air for 30 days or longer at 300° C.

SUMMARY OF THE INVENTION

The above described disadvantages in the prior art room temperature-curable silicone rubber compositions can be overcome by the present invention which relates to a room temperature-curable silicone rubber composition comprising:
(A) 100 parts by weight of an organopolysiloxane containing hydroxy groups in a molecule;
(B) from 0.5 to 25 parts by weight of an organosilicon compound having at least two hydrolyzable groups in a molecule;
(C) from 0.01 to 5 parts by weight of a curing catalyst;
(D) from 5 to 30 parts by weight of carbon black; and
(E) from 0.1 to 10 parts by weight of iron oxide.

DETAILED DESCRIPTION OF THE PREFERRED EMBODIMENTS

The organopolysiloxane as the component (A) comprised in the room temperature-curable silicone rubber composition of the invention should contain hydroxy groups as the functional groups in a molecule and usually has two hydroxy groups as the blocking groups at both terminals of the molecular chain. Namely, the organopolysiloxane should preferably be an $\alpha,\omega$-dihydroxy diorganopolysiloxane. Such organopolysiloxanes are well known as a base material of silicone rubbers in the prior art. The kinds of the organic groups directly bonded to the silicon atoms in the organopolysiloxane molecules are not particularly limitative in the invention. Examples of the organic groups include alkyl groups such as methyl, ethyl, propyl and butyl groups, cycloalkyl groups such as cyclopentyl and cyclohexyl groups, alkenyl groups such as vinyl and allyl groups, aryl groups such as phenyl, tolyl and naphthyl groups, aralkyl groups such as 2-phenylethyl group and groups containing halogen, e.g. chlorine, atoms and amino groups substituting for a part or all of the hydrogen atoms in the above named hydrocarbon groups. The organopolysiloxane should have such a degree of polymerization as to give a viscosity, preferably, in the range from 100 to 1,000,000 centistokes or, more preferably, in the range from 1,000 to 50,000 centistokes at 25° C. since an organopolysiloxane having a viscosity lower than 100 centistokes at 25° C. would not give a cured product having excellent mechanical strengths and, on the other hand, an organopolysiloxane having a viscosity higher than 1,000,000 centistokes at 25° C. tends to unduly increase the consistency of the composition containing the same thus resultantly to decrease the workability of the composition in application.

The organosilicon compound as the component (B) in the inventive composition should contain at least two or, preferably, three hydrolyzable groups directly bonded to the silicon atom or atoms per molecule since the compound functions as a crosslinking agent for curing the composition. Examples of such hydrolyzable groups include acyloxy groups such as acetoxy, octanoyloxy and benzoyloxy groups, ketoxime groups such as dimethyl ketoxime, methyl ethyl ketoxime and diethyl ketoxime groups, alkoxy groups such as methoxy, ethoxy and propoxy groups, alkenyloxy groups such as isopropenyloxy and 1-ethyl-2-methylvinyloxy groups, amino groups such as dimethylamino, diethylamino, butylamino and cyclohexylamino groups, aminoxy groups such as dimethyl aminoxy and diethyl aminoxy groups, amido groups such as N-methyl acetamido, N-ethyl acetamido and N-methyl benzamido groups and so on.

The organosilicon compound as the component (B) is not particularly limitative provided that a molecule thereof has at least two hydrolyzable groups. Various types of groups other than the above mentioned hydrolyzable ones can be bonded to the silicon atom or atoms of the compound. The molecular configuration thereof is also not limitative including organosilanes and organopolysiloxanes. When the compound is an organopolysiloxane, the molecular structure may be straightly linear, branched chain-like or cyclic. Examples of the above mentioned groups other than the hydrolyzable ones are monovalent hydrocarbon groups including alkyl groups such as methyl, ethyl, propyl and butyl groups, cycloalkyl groups such as cyclopentyl and cyclohexyl groups, alkenyl groups such as vinyl and allyl groups, aryl groups such as phenyl, tolyl and naphthyl groups, aralkyl groups such as 2-phenylethyl group, iminoalkyl groups such as those expressed by the formulas $(CH_3)_2=N-(-CH_2-)_3-$ and
$(CH_3)(C_2H_5)C=N-(-CH_2-)_3-$, as well as those substituted groups obtained by the replacement of a part or all of the hydrogen atoms in the above named hydrocarbon groups with substituents such as halogen, e.g. chlorine, atoms. A preferable class of the component (B) includes alkenyloxysilane compounds represented by the general formula $R^2_{4-n}Si(O-CR^3=CHR^4)_n$, in which $R^2$ is an unsubstituted or substituted monovalent hydrocarbon group having 1 to 8 carbon atoms in a molecule, $R^3$ and $R^4$ are each a hydrogen atom or an unsubstituted or substituted monovalent hydrocarbon group and n is 3 or 4, or a partial hydrolyzate thereof.

Several of the particular examples of organosilicon compound suitable as the component (B) include those expressed by the following formulas, in which Me, Et, Vi, Ph and $C_6H_{11}$ denote methyl, ethyl, vinyl, phenyl and cyclohexyl groups, respectively: $(MeCOO)_3SiMe$; $(MeEtC=N-O)_3SiMe$; $(MeO)_3SiMe$; $(MeO)_3SiVi$; $(CH_2=CMe-O)_3SiPh$; $(CH_2=CMe-O)_3SiMe$; $(C_6H_{11}-NH)_3SiMe$; and $(MeCO-NEt)_3SiMe$. These compounds can be used either singly or as a combination of two kinds or more according to need. The preferred amount of the component (B) in the inventive composition is in the range from 0.5 to 25 parts by weight per 100 parts by weight of the component (A) since the component (B) in an amount smaller than 0.5 part by weight would sometimes cause gelation of the composition during the manufacturing process or in storage thus making it impossible to give a cured product having excellent physical properties as desired and, on the other hand, an amount larger than 25 parts by weight of the component (B) would cause an unduly large shrinkage of the composition during curing and, furthermore, an extreme delay of curing as well as decrease in the elasticity of the cured products thus obtained.

The curing catalyst as the component (C) compounded in the inventive composition may be selected from those conventionally used in the prior art for compositions of the same kind. Examples of the component (C) include metal salts of of a carboxylic acid such as lead 2-ethylhexoate, dibutyl tin dioctoate, dibutyl tin diacetate, dibutyl tin dilaurate, butyl tin 2-ethylhexoate, iron 2-ethylhexoate, cobalt 2-ethylhexoate, manganese 2-ethylhexoate, zinc 2-ethylhexoate, tin(II) caprylate, tin naphthenate, tin oleate, tin butyrate, titanium naphthenate, zinc naphthenate, cobalt naphthenate and zinc stearate, organic titanate esters such as tetrabutyl titanate, tetra-2-ethylhexyl titanate, triethanolamine titanate and tetra(isopropenyloxy) titanate, organic titanium compounds such as organosiloxy titanium and β-carbonyl titanium, amine compounds and salts thereof such as hexylamine and dodecylamine phosphate, quaternary ammonium salts such as benzyl triethyl ammonium acetate, lower fatty acid salts of an alkali metal such as potassium acetate, sodium acetate and lithium oxalate, dialkyl hydroxylamines such as diethyl hydroxylamine, guanidine compounds and guanidino group-containing silanes or siloxanes such as those represented by the formula $GSi(OMe)_3$ or
$Me_3Si-O-(-SiMeG-O-)_2-SiMe_3$.

in which Me is a methyl group and G is a 3-(1,1,3,3,-tetramethylguanidino)propyl group, and the like. These compounds are used not only along but as a combination of two kinds or more according to need. In particular, certain aminoalkyl-substituted alkoxysilanes such as 3-aminopropyl triethoxy silane and N-(3-trimethoxysilyl propyl) ethylenediamine can be used as the curing catalyst when the component (B) is an alkenyloxy silane.

The compounds named above as the component (C) are used in an amount from 0.01 to 5 parts by weight or, preferably, from 0.1 to 3 parts by weight per 100 parts by weight of the above mentioned component (A) since the component (C) in an amount smaller than above would retard the curing reaction and, furthermore, induce difficulty in obtaining homogeneity of the degree of curing to the depth of a cured shaped body having a relatively large thickness and, on the other hand, an excessively large amount of the component (C) would extremely shorten the time for film-formation on the surface of the composition thus to induce some inconveniences in the handling and, in addition, would decrease the heat-resistance and weatherability of the cured products.

Carbon black as the component (D) in the composition of the present invention is the most characteristic ingredient to achieve the object of the invention. The carbon black can be a furnace black, channel black or thermal black. Any kind of carbon black named above may be suitably used in the composition of the invention provided that the specific surface area thereof is at least 5 $m^2/g$. The required amount of the component (D) is in the range from 5 to 30 parts by weight or, preferably, from 10 to 20 parts by weight per 100 parts by weight of the component (A) since an amount smaller than 5 parts by weight of the carbon black would not impart sufficient heat-resistance to the cured composition while an amount larger than 30 parts by weight of the carbon black would decrease the workability of the composition, in particular, in extrusion.

Iron oxide as the component (E) compounded in the composition of the present invention is also an important ingredient in consideration of the object of improving the heat-resistance of the cured composition by the combined use with the above mentioned component (D). Suitable iron oxides are those having a structure of magnetite, maghemite or hematite shown by the formula α-$Fe_2O_3$, γ-$Fe_2O_3$ or $Fe_3O_4$, and the most preferable species among them is the α-type iron oxide consisting of needle-like particles with a hexagonal crystalline structure, the major and minor axes of which are 0.1 to 0.2 mm and 0.02 to 0.03 mm, respectively. The required amount of the component (E) is in the range from 0.1 to 10 parts by weight or, preferably, from 3 to 7 parts by weight per 100 parts by weight of the component (A) since an amount smaller than 0.1 part by weight of the iron oxide would give no advantageous effect of upgrading the heat-resistance of the cured composition and an amount larger than 10 parts by weight of the iron oxide would deteriorate the physical properties of the cured product of the composition.

The composition of the present invention is obtained by homogeneously mixing the above mentioned components (A) to (E). The mixing work of the components may be carried out by any known method. A preferred procedure of mixing consists of a preliminary step of mixing of the components (A), (D) and (E) to uniformity followed by the addition of the components (B) and (C) and further uniformization. The compositions may be supplied either in a one-package form or in a two-package form. The composition of the former type is usually packed in an air-tight package such as a cartridge or a flexible tube so as to be squeezed out for applying. When the composition is supplied in a two-package form, one of the two packages contains the curable organopolysiloxane ingredient while the other contains the curing agent and the contents of the two packages are blended together directly before use. In addition, the composition of the present invention may be optionally admixed according to need with various known additives including plasticizers, colorants such as pigments and the like, flame-retardants, thixotropy-imparting agents, germicides, fungicides, adhesion-promoting agents selected from so-called carbon-functional silanes containing amino groups, epoxy groups, thiol groups and the like and other auxiliaries each in a limited amount not to cause any adverse influences on the properties of the inventive composition.

In the following, the room temperature-curable silicone rubber composition of the invention is described in more detail by way of examples and comparative examples, in which the term "parts" always refers to "parts by weight" and the values of viscosity are those obtained by the measurement at 25° C.

Examples 1 to 3 and Comparative Examples 1 and 2.

Carbon black (Denka Black, a product manufactured by Denki Kagaku Kogyo Co.) and iron oxide (TB420S, a product manufactured by Mitsubishi Metal Corp.) each in an amount shown in Table 1 in each of the examples were added to 100 parts of a dimethylpolysiloxane having a viscosity of 5,000 centistokes and consisting of linear molecules terminated at both molecular chain ends each with a hydroxy group to form a preparatory polymer mixture. The preparatory polymer mixture was then admixed with 10 parts of an organosilane compound expressed by the formula $$[CH_3)(C_2H_5)C=N-O]_3SiCH=CH_2$$

and dibutyl tin dioctoate each in an amount shown in Table 1 to form room temperature-curable silicone rubber compositions I, II and III and homogeneously blended together in Examples 1, 2 and 3, respectively. Separately, a first comparative room temperature-curable silicone rubber composition IV in Comparative Example 1 was prepared by adding a fumed silica filler in an amount shown in Table 1 substituting for the carbon black in the compositions I to III and also a second comparative room temperature-curable silicone rubber composition V in Comparative Example 2 was prepared by blending the carbon black but with omission of the $\alpha$-$Fe_2O_3$.

Each of these compositions I to V was shaped by extrusion molding into a sheet having a thickness of 2 mm which was then subjected to curing by standing for 7 days in an atmosphere of a relative humidity of 55% at 23° C. The physical properties of these cured silicone rubber sheets were measured as cured in this

TABLE 1

| Component (parts) | Composition No. | | | | |
|---|---|---|---|---|---|
| | I | II | III | IV | V |
| Dimethylpolysiloxane | 100 | 100 | 100 | 100 | 100 |
| Carbon black | 10 | 20 | 20 | — | 20 |
| Fumed silica | — | — | — | 15 | — |
| $\alpha$-$Fe_2O_3$ | 0.1 | 0.1 | 0.1 | 0.3 | — |
| Organosilane compound | 10 | 10 | 10 | 10 | 10 |
| Dibutyl tin dioctoate | 1 | 3 | 10 | 2 | 3 | manner and after thermal aging in air for 14 days at 300° C. The results are shown in Table 2.

Examples 4 and 5.

A preparatory polymer mixture was prepared by admixing 20 parts of carbon black and 3 parts of $\alpha$-$Fe_2O_3$ each of the same kind as used in the preceding examples with 100 parts of a dimethylpolysiloxane having a viscosity of 5,000 centistokes and consisting of linear molecules terminated at both molecular chain ends each with a hydroxy group. Room temperature-curable silicone rubber compositions VI and VII were prepared each by admixing 100 parts of the above prepared preparatory polymer mixture with 6 parts of methyl triacetoxy silane or methyl tri(isopropenyloxy) silane, respectively, and 0.2 part of dibutyl tin

TABLE 2

| | Composition No. | Hardness, JIS | Tensile strength, kg/cm$^2$ | Ultimate elongation, % |
|---|---|---|---|---|
| As cured | I | 25 | 18 | 350 |
| | II | 45 | 25 | 285 |
| | III | 55 | 28 | 230 |
| | IV | 35 | 21 | 210 |
| | V | 45 | 23 | 300 |
| After 14 days at 300° C. | I | 40 | 18 | 280 |
| | II | 53 | 22 | 300 |
| | III | 60 | 26 | 200 |
| | IV | (not measurable) | | |
| | V | 60 | 12 | 40 | diacetate or 0.5 part of 3-(1,1,3,3-tetramethyl-guanidino)propyl trimethoxy silane, respectively.

Each of these compositions VI and VII was shaped by extrusion molding into a sheet having a thickness of 2 mm which was then subjected to curing by standing for 7 days in an atmosphere of a relative humidity of 55% at 23° C. The physical properties of these cured sheets were measured as cured in this manner and after thermal aging for 30 days at 300° C. in air. The results are shown in Table 3.

TABLE 3

| | Composition No. | Hardness, JIS | Tensile strength, kg/cm$^2$ | Ultimate elongation, % |
|---|---|---|---|---|
| As cured | VI | 43 | 18 | 290 |
| | VII | 44 | 27 | 440 |
| After 30 days at 300° C. | VI | 51 | 20 | 180 |
| | VII | 55 | 23 | 200 |

What is claimed is:

1. A room temperature-curable silicone rubber composition which comprises:
   (A) 100 parts by weight of an organopolysiloxane containing hydroxy groups in a molecule;

(B) from 0.5 to 25 parts by weight of an organosilicon compound having at least two hydrolyzable groups per molecule;
(C) from 0.01 to 5 parts by weight of a curing catalyst;
(D) from 5 to 30 parts by weight of carbon black; and
(E) from 0.1 to 10 parts by weight of iron oxide.

2. The room temperature-curable silicone rubber composition as claimed in claim 1 in which the organopolysiloxane as the component (A) is an α,ω-dihydroxy diorganopolysiloxane.

3. The room temperature-curable silicone rubber composition as claimed in claim 1 in which the organosilicon compound as the component (B) is a compound represented by the general formula $R^1SiX_3$ in which $R^1$ is an unsubstituted or substituted monovalent hydrocarbon group having 1 to 8 carbon atoms in a molecule and X is a hydrolyzable group.

4. The room temperature-curable silicone rubber composition as claimed in claim 1 in which the organosilicon compound as the component (B) is an alkenyloxysilane represented by the general formula $$R^2{}_{4-n}Si(O-CR^3=CHR^4)_n.$$

in which $R^2$ is an unsubstituted or substituted monovalent hydrocarbon group having 1 to 8 carbon atoms, $R^3$ and $R^4$ are each a hydrogen atom or an unsubstituted or substituted monovalent hydrocarbon group and n is 3 or 4, or a partial hydrolyzate thereof.

5. The room temperature-curable silicone rubber composition as claimed in claim 1, in which the curing catalyst as the component (C) is a silane compound or an organopolysiloxane compound having at least one of the guanidino groups represented by the formula $$-N=C[N(R^5)(R^6)][N(R^7)(R^8)],$$

in which $R^5$, $R^6$, $R^7$ and $R^8$ are each a hydrogen atom or an unsubstituted or substituted monovalent hydrocarbon group, in a molecule.

* * * * *